Dec. 6, 1966  D. J. GAFFNEY  3,289,494
ADJUSTING MEANS FOR CAMS AND THE LIKE
Filed July 10, 1964  2 Sheets-Sheet 1
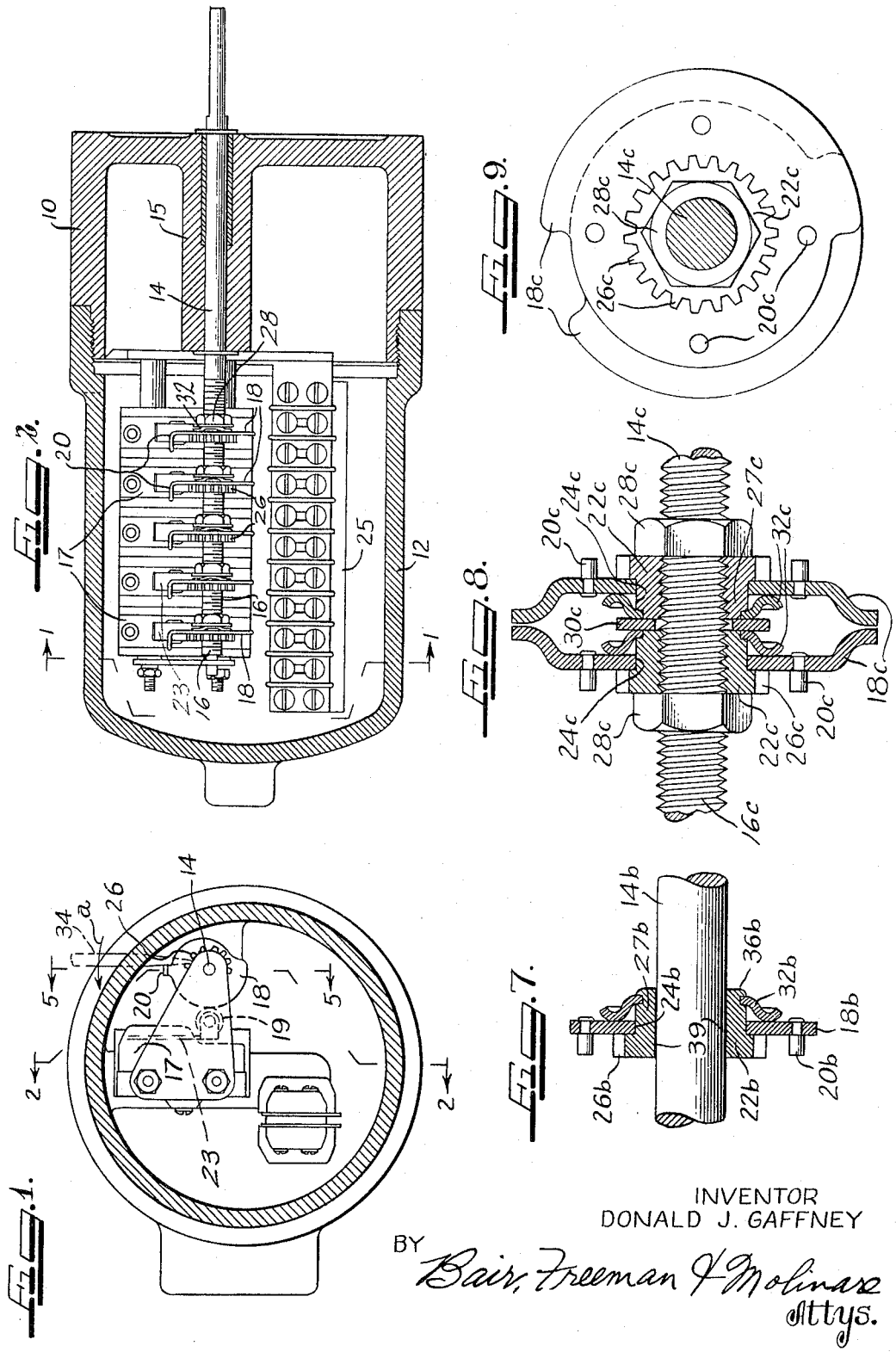
INVENTOR
DONALD J. GAFFNEY
BY Bair, Freeman & Molinare
Attys.

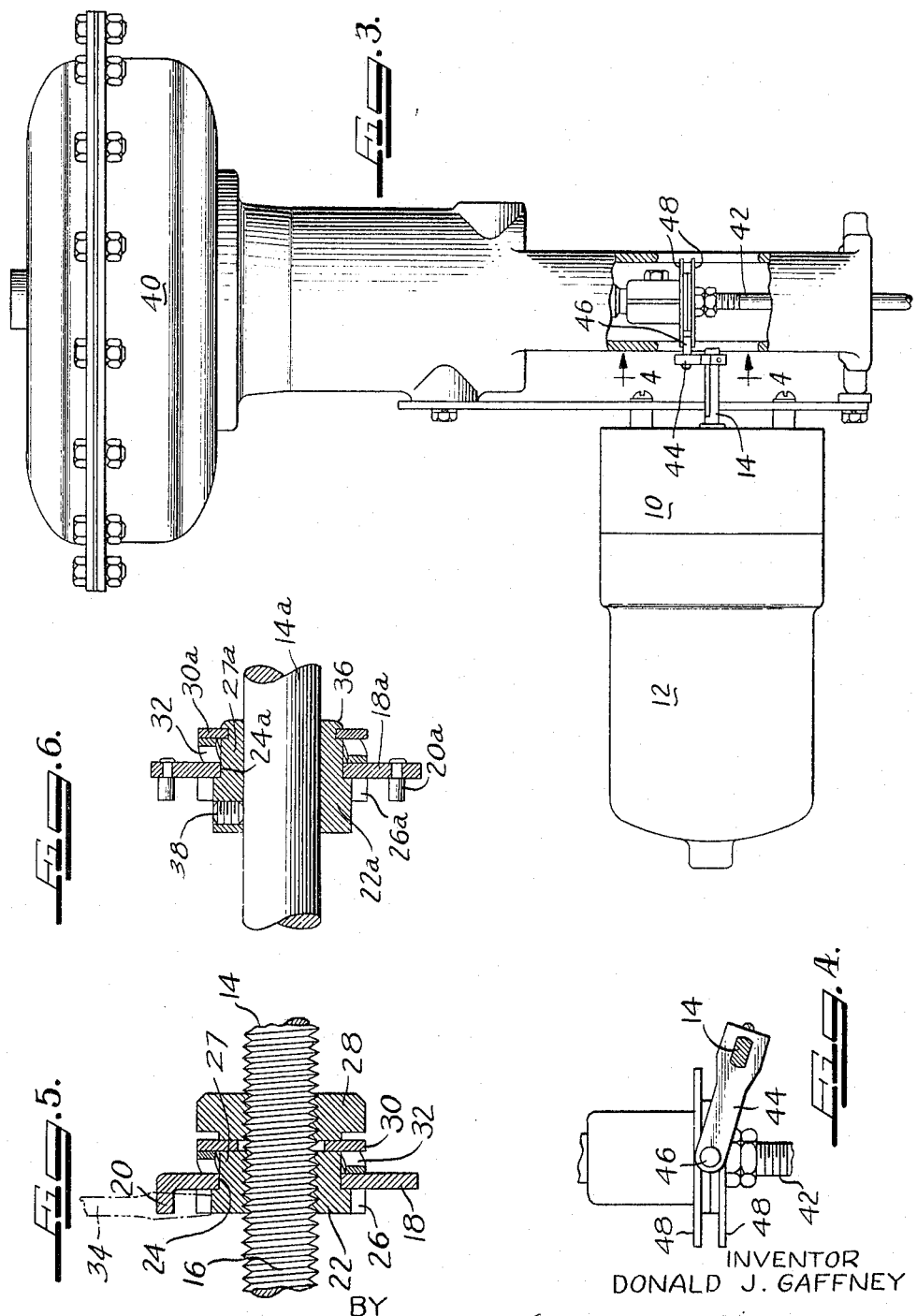

United States Patent Office 3,289,494
Patented Dec. 6, 1966

3,289,494
ADJUSTING MEANS FOR CAMS AND THE LIKE
Donald J. Gaffney, Marshalltown, Iowa, assignor to Fisher Governor Company, Marshalltown, Iowa, a corporation of Iowa
Filed July 10, 1964, Ser. No. 381,688
9 Claims. (Cl. 74—568)

This invention relates to adjusting means for an element mounted on a shaft and rotatable relative thereto, such as cam means on an actuating shaft wherein the cam actuates a control switch or the like.

One object of the invention is to provide adjusting means for cams, gears or the like, which are rotatable about an axis so that infinitely small increments of rotation and thereby adjustment may be accomplished using simple tools.

Another object is to provide adjusting means for cams used to actuate snap switches or the like.

Still another object is to provide adjusting means for an element rotatable relative to a shaft in which friction means is interposed between the shaft and the element to permit such adjustment and to thereafter retain the same, means being provided to effect such adjustment comprising a toothed disc or the like fixed relative to the shaft and adapted for the end of an adjusting lever to selectively coact with the teeth thereof, the element having a projection spaced beyond the periphery of the disc and adapted for the side of the adjusting lever intermediate the ends thereof to engage whereby the projection may be moved circumferentially relative to the shaft and disc by the application of pressure to the outer end of the lever.

I am aware of prior adjusting means where, in general, it is usually necessary to adjust the make or break point of switches to correspond to a definite position of an actuator shaft. For instance, it may be desirable to cause an indicator light to turn on or off as a valve plug reaches a definite point in its travel. It is, therefore, necessary to be able to rotate the cam with respect to the shaft.

I am aware of specific prior adjusting devices in which it is tedious and sometimes impossible to rotate the cam to cause the switch to snap closed or open at precisely the desired point. In some it is necessary to loosen locking nuts or screws, manually rotate the cam and then tighten the nuts or screws. This often causes the cam to slip out of position during the retightening of the nuts or screws. On devices having cams of large size micrometer-like adjustment can be had by means of worm gear arrangements or other equally precise and often costly devices. On devices employing smaller cams or gears there often isn't space available for incorporation of such adjustments. The present invention is an adjustable means which is especially suited to small cams or gears although it could equally and beneficially be utilized by any size rotary member.

It is, therefore, a further object of my invention to simplify prior adjusting devices in a manner disclosed in the following specification, a simple lever, screwdriver or the like constituting a readily available tool to effect adjustment.

With these and other objects in view, my invention consists in the the construction, arrangement and combination of the various parts of my adjusting means for cams and the like, whereby the objects above contemplated are attained, as hereinafter more fully set forth, pointed out in my claims and illustrated in detail on the accompanying drawings, wherein:

FIG. 1 is a sectional view through a switch housing showing an actuating shaft for a switch and a cam on the shaft for actuating the switch, my improved adjusting means being applied thereto;

FIG. 2 is a vertical sectional view on the line 2—2 of FIG. 1 to show further details and a plurality of cams and switches, FIG. 1 being a vertical sectional view on the line 1—1 of FIG. 2;

FIG. 3 is a side elevation of FIG. 2 on a reduced scale showing the switch housing mounted on a diaphragm actuator for a valve or the like;

FIG. 4 is an enlarged sectional view on the line 4—4 of FIG. 3;

FIG. 5 is an enlarged sectional view on the line 5—5 of FIG. 1 showing details of construction of one of the actuating cams and its associated mechanism;

FIG. 6 is a sectional view similar to FIG. 5 showing a modified construction;

FIG. 7 is a sectional view similar to FIG. 6 showing another modified construction;

FIG. 8 is a sectional view similar to FIG. 7 showing a modified construction applied to a typical adjustable dwell cam arrangement, and FIG. 9 is an end view of FIG. 8.

On the accompanying drawings I have used the reference numerals 10 and 12 to indicate a two-part switch housing and 14 a cam shaft oscillatably mounted in a boss 15 of the housing portion 10. Cams 18 are mounted on the cam shaft 14 as shown in FIG. 2 and are adapted to actuate snap switches or the like 17. As shown in FIG. 1 actuation is by rotation of the cam 18 against which a roller 19 (carried by an actuating blade 23) of the switch 17 engages in the usual manner. A terminal block 25 is shown for the switches 17.

Referring to FIG. 5 one method of mounting the cam 18 on the shaft 14 is shown, the shaft being threaded as indicated at 16 and the cam having a stamped projection 20, the purpose of which will hereinafter appear. A disc 22 provided with a hub 27 is threaded on the shaft 14 and has a shouldered down portion 24 on which the cam 18 is rotatable. The disc 22 forms a shoulder or flange portion for the cam 18. The disc 22 is provided with gear-like teeth 26 in its periphery as shown in FIGS. 1 and 2 and a washer 30 to form a shoulder or or flange portion is confined between the disc and a nut 28 which is also threaded on the shaft 14. The thread 16 permits adjustment of the disc 22 and the nut 28 longitudinally of the shaft for properly positioning each cam 18 with respect to its respective snap switch 17 which it operates, a plurality of the cams and switches being illustrated in FIG. 2, which also illustrates the obvious requirement for alignment of cams with switches.

The disc 22 is adjusted to the desired position and the nut 28 used to rigidly fix the wsaher 30 between the two. The distance between the washer 30 and the shoulder of the disc 22 is filled by the cam 18 and a friction spring 32 of the Belleville spring washer type with the spring washer under tension for providing sufficient friction to hold the cam 18 against rotation relative to the shaft 14 during normal operations for actuating the snap switch. The hub 27 is, of course, the proper length to compress the spring washer to the desired degree.

The friction connection, however, permits rotatable adjustment of the cam 18 relative to the disc 22 and thereby the shaft 14 in the manner disclosed in FIGS. 1 and 5. A screwdriver 34 shown in dot-and-dash lines has its point engaged between two of the teeth 26 of the disc and its side engaged with the projection 20 so that it acts as a lever, and when swung in the direction of the arrow *a* will adjust the cam 18 counterclockwise relative to the cam shaft 14. The housing part 12 is unscrewed from the housing part 10 to accomplish such adjustment.

When replaced the housing completely encloses the switches and cams to prohibit entrance of dust or other foreign matter which might cause malfunctioning of the cams and switches. Thus a simple construction using a readily available tool such as a screwdriver (or any suitable lever) makes for easy, quick and precise adjustment of the cam in its position rotationally of the cam shaft.

FIG. 3 illustrates one environment for adjusting means of the kind herein disclosed. A diaphragm actuator 40 is shown for imparting reciprocations to a stem 42 of a valve or the like (not shown). It is desirable to actuate the various switches 17 at different longitudinal positions of the stem 42 and accordingly the cam shaft is provided with a lever 44 having a crank pin 46 located between discs 48 mounted on the stem 42. Longitudinal movement of the stem 42 is thus translated into oscillations of the cam shaft 14.

It is necessary to initially assemble the set of cams when the unit is built, and subsequent adjustment can be made by use of the blade 34 as described. A prying motion with the blade causes the cam to rotate about the axis of the shaft 14 and very small incremental adjustment can thus be easily accomplished. FIGS. 1, 2 and 5 show one form that the adjusting means may take. FIGS. 6, 7, 8 and 9 show other forms.

In FIG. 6 elements comparable to those shown in FIG. 5 bear the same reference numerals with the addition of the distinguishing characteristic $a$. The cam 18$^a$ in this case has a plurality of projections 20$^a$ instead of the single projection 20 as shown in FIG. 1 in case the single projection is difficult to get at for adjustment purposes in some installations. Instead of the lock nut 28 of FIG. 5, the washer 30$^a$ of FIG. 6 is held in position on the disc 22$^a$ by the same being peened over as at 36. Instead of the shaft 14$^a$ being threaded, the disc 22$^a$ is held in position and can be longitudinally adjusted relative to the cam shaft by means of a set screw 38.

In FIG. 7 the disc 22$^b$ is secured to the shaft 14$^b$ by silver soldering 39, brazing, welding or the like, and instead of a Belleville spring washer, a cupped spring washer 32$^b$ is shown to provide the desired friction. It is mounted directly on the hub 27$^b$ by peening.

In FIGS. 8 and 9 a typical adjustable dwell cam arrangement is shown in which two cam members 18$^c$ may be used to advantage on certain timing mechanisms. Again as in the previous modifications, the cams may be adjusted accurately to actuate a switch and the adjustment is simple to accomplish with only a bladed tool with no unlocking or locking required. The overlap of the two cams and thus the trough between them as shown at the top in FIG. 9 can be adjusted as to length as well as each individually rotatably about the shaft 14$^c$.

From the foregoing specification it will be obvious that I have provided adjusting means for cams and the like eliminating the necessity of using wrenches. Instead a bladed instrument such as a screwdriver, steel scale or even a nail or piece of wire or similar available tool can be used to accomplish infinitely fine adjustment.

Some changes may be made in the construction and arrangement of the parts of my adjusting means for cams and the like without departing from the real spirit and purpose of my invention, and it is my intention to cover by my claims any modified forms of structure or use of mechanical equivalents which may reasonably be included within their scope.

I claim as my invention:

1. In adjusting means of the character disclosed, a rotatable shaft, an element carried thereby for rotation therewith and rotatably adjustable thereon, friction means interposed between said shaft and said element to permit such adjustment and to thereafter retain the same, means to effect such adjustment comprising a disc fixed relative to said shaft and having a toothed periphery adapted for the end of an adjusting lever to selectively coact with the teeth thereof, and a projection on said element spaced beyond the periphery of said disc and adapted for the side of such adjusting lever intermediate the ends thereof to engage whereby said projection may be moved circumferentially relative to said shaft and disc by the application of pressure to the outer end of said lever.

2. Adjusting means according to claim 1 wherein said element is a cam and said friction means is a friction washer.

3. Adjusting means according to claim 2 wherein said friction washer has one side engaging one side of said cam, said shaft having a first flange portion with which the other side of said friction washer engages and a second flange portion opposing said first cam portion and with which the other side of said cam engages.

4. Adjusting means for a cam actuated switch comprising a rotatable shaft, said cam being carried thereby and rotatable thereon, means for normally fixing said cam relative to said shaft comprising spaced opposed shoulders on said shaft, said cam and a friction washer being interposed between said shoulders, and means for rotatably adjusting said cam relative to said shoulders comprising an element fixed on said shaft having spaced teeth along its outer edge adapted to selectively receive the end of an adjusting lever, said cam having a projection against which a portion of said lever spaced inwardly from the outer end thereof may bear to effect rotation of said cam relative to said element.

5. Adjusting means as claimed in claim 4 wherein said element is a gear-like disc with said teeth around its periphery.

6. Adjusting means for a cam actuated switch comprising a rotatable shaft, a cam element carried thereby and rotatable relative thereto, friction means to normally prevent such rotation, a disc element fixed relative to said shaft, one of said elements having a toothed portion spaced from the center of rotation and the other having a projection positioned radially outward relative to the teeth of said one element for one side and an end respectively of an adjusting lever to engage whereby pivoting of said lever about said end effects relative rotation of said cam element, and to said shaft and disc element against the friction bias of said friction means.

7. Adjusting means according to claim 6 wherein said friction means is a friction washer.

8. Adjusting means according to claim 6 wherein said friction means is a friction washer which has one side engaging one side of said cam, said shaft having a first flange portion with which the other side of said friction washer engages and a second flange portion opposing said first flange portion with which the other side of said cam engages.

9. Adjusting means according to claim 6 wherein said shaft is threaded, a plurality of said cam elements are mounted thereon and their disc elements are threaded on said shaft for the desired positioning thereof longitudinally of said shaft.

References Cited by the Examiner
UNITED STATES PATENTS 2,978,072  4/1961  Burnett _____ 188—79.5
3,188,503  6/1965  Hendry _____ 200—38

FRED C. MATTERN, Jr. *Primary Examiner.*

MILTON KAUFMAN, *Examiner.*

W. S. RATLIFF, *Assistant Examiner.*